July 10, 1956
C. A. ERICKSON
2,753,647
FISHING DEVICE
Filed March 24, 1955
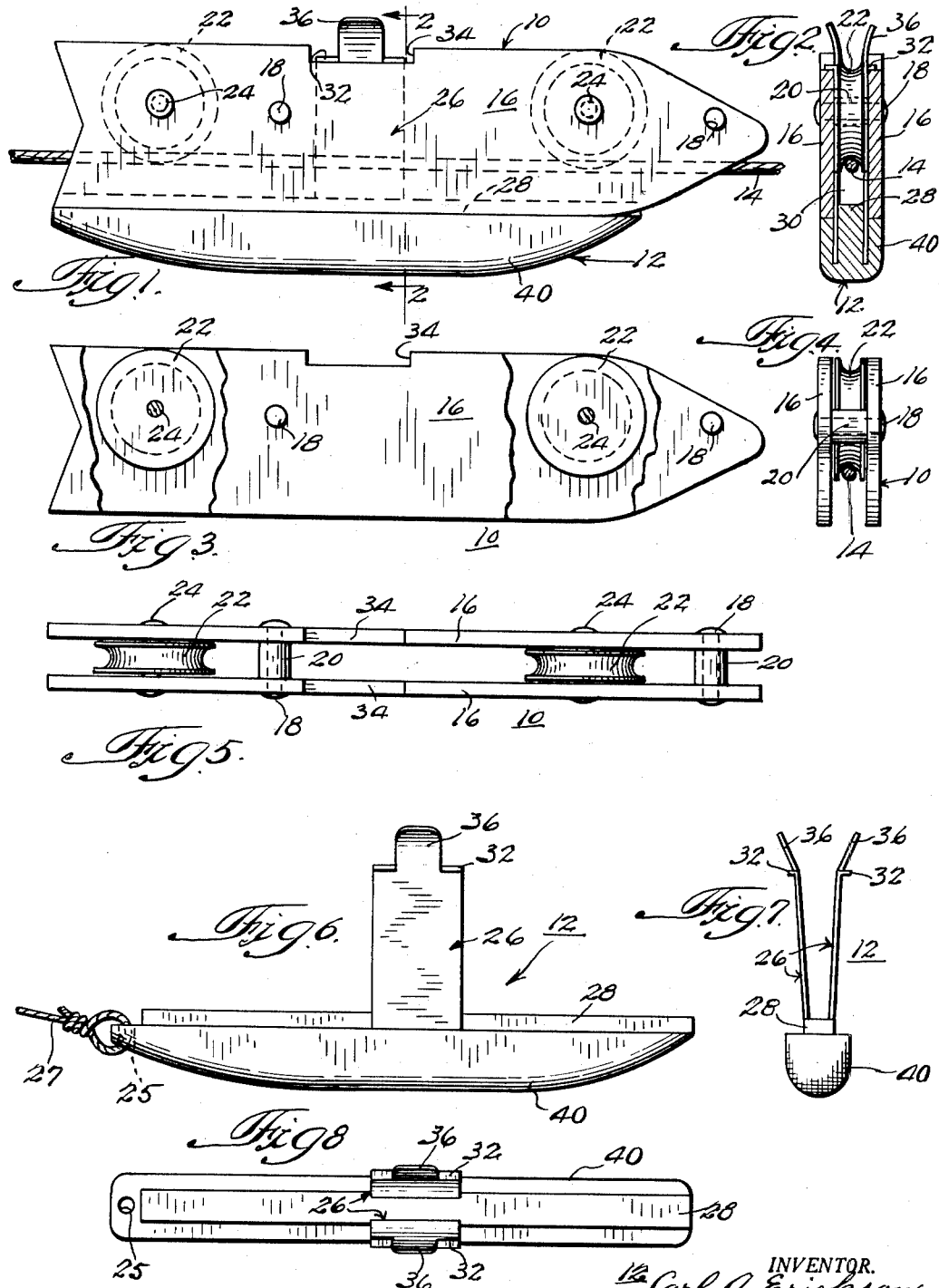
INVENTOR.
Carl A. Erickson.

United States Patent Office 2,753,647
Patented July 10, 1956

2,753,647

FISHING DEVICE

Carl A. Erickson, Chicago, Ill.

Application March 24, 1955, Serial No. 496,447

6 Claims. (Cl. 43—27.2)

The present invention relates to an improved fishing device, and, more particularly, pertains to a fishing trolley construction which may engage and disengage from an anchored trolley line in a rapid and facile manner.

This invention is concerned with a fishing device or trolley adapted to travel on an anchored trolley line. The trolley engages a fishing line on which is supported a plurality of fish hooks; the fishing line also enables the trolley and hooks to be moved through the water by the fisherman as desired. The usual trolley construction utilizes a weight portion, to facilitate movement through water, and a plurality of trolley wheels, journalled in individual brackets or frames, which rotatably engage the anchored trolley line. The weight portion is usually provided with an aperture or eye to enable the fishing line to be secured thereto.

However, in prior art constructions, the attachment or detachment of the trolley to the trolley line was often accompanied by difficulties arising from the manner in which the trolley wheels were locked in the frames or brackets. Usually, each wheel bracket had a flexible clamp portion or movable yoke portion through which the trolley line passed, necessitating a separate line-engaging or disengaging process for each wheel. In addition, the bracket constructions were so designed that movement of the trolley through the water often times caused the trolley to become disengaged from the trolley line.

It is an object, therefore, of this invention to provide a trolley construction in which the trolley line is readily locked to, or disengaged from, both trolley wheels in a single act of assembly or disassembly.

It is another object of this invention to provide a trolley construction which will remain engaged to a trolley line even when moving through agitated waters.

It is still another object of this invention to provide a trolley construction utilizing a minimum number of parts assuring both efficiency in operation and low unit cost.

Further and additional objects will appear from the description, accompanying drawings and appended claims.

In carrying out this invention in one form, two plate members are maintained in fixed spaced-apart relationship by suitable spacers, such as rivets or bolts. The plate members have journalled therebetween two grooved trolley wheels adapted to rotate on a trolley line. An elongated weight member subtends both trolley wheels and is adapted to releasably engage the opposed plate members by means of two flexible arm members having protruding lugs thereon. These lug members, in the normal assembled position, engaged slotted portions of the opposed plates and also maintain the weight member in socketed engagement with the lower edges of the plate members by means of an elongated rib which is formed integral with the weight member and which is snugly received in the interval between the opposed plate bottom portions.

For a more complete understanding of this invention, reference should now be had to the drawings, wherein Figure 1 is a front elevational view of one embodiment of the invention;

Fig. 2 is a transverse sectional view taken on line 2—2 of Figure 1;

Fig. 3 is a front elevational view of the frame portion of the trolley and is partly broken away to reveal the trolley wheels;

Fig. 4 is an end elevational view of the embodiment illustrated in Fig. 3;

Fig. 5 is a top plan view of the frame portion of the trolley;

Fig. 6 is a front elevational view of the weight portion of the trolley;

Fig. 7 is an end elevational view of the embodiment illustrated in Fig. 6; and

Fig. 8 is a top plan view of the embodiment illustrated in Fig. 6.

Referring now to the drawings and, more particularly, to Figure 1, it will be noted that the trolley construction comprises a frame assembly 10 and a weight assembly 12, which, when in the assembled position, is adapted to travel on a trolley line 14.

Referring now to Figs. 3 and 4, it will be seen that the frame assembly comprises two opposed plate members 16 which, in this instance, are maintained in spaced-apart relationship by means of bolt members 18 which have disposed thereon intermediate their end limits tubular spacer members 20. Journalled in the opposed members 16 are grooved wheels 22 which are rotatably mounted on pin members 24. It is apparent from Fig. 4 that the frame member by itself could not rotatably engage the trolley line 14 without soon becoming disengaged therefrom upon a slight twist or turning of the frame 10.

To enable the trolley line 14 and the trolley assembly to maintain their rotatable relationship in the course of movement through the water and to facilitate movement of the trolley assembly through the water, the weight assembly 12 is provided comprising weight portion 40 and flexible spring arm members 26 (see Figs. 6, 7, and 8). The weight portion 12 is apertured at 25 to facilitate engagement thereof by a fishing line 27 having a plurality of hooks affixed thereto (not shown). The fishing line 27, in addition to carrying the hook members, enables the trolley assembly to be moved through the water as desired on the line 14. The weight portion 40 has surmounted thereon and formed integral therewith a longitudinal rib 28 which is adapted to be snugly received between the lower end portions of the opposed plate members 16 of the frame assembly 10, as is illustrated in Fig. 2. It will be noted in Fig. 2 that the opposed inner surfaces of the plate members 16, the top surface of the rib 28, and the lowermost portions of the two wheel members 22 define a channel 30 in which the line 14 may be securely confined, in the course of engaging the wheels 22 during normal operation.

To maintain the weight assembly 12 in fixed engagement with the frame assembly 10, the weight assembly is provided with resilient spring arm members 26, having their distal end portions in a spaced-apart relationship which is of a greater magnitude than the interval between the opposed plate members 16. Consequently, in the course of assembling the frame and the weight portions of the trolley, the arm portions 26 are inserted between the opposed plate members 16 until angularly disposed lug portions 32 of the arms (see Fig. 7) rise above slotted top edge portions 34 of the opposed plate members 16, more clearly seen in Fig. 5. Upon rising above the edge surfaces of the slots 34, the lugs 32 will lock the weight assembly 12 to the frame assembly 10. As will be noted from Fig. 2, the rib portion 28 of the weight assembly is simultaneously snugly received between the lower end limits of the plates 16. It is obvious that in the course of assembling the weight and frame portions of the trolley, the arm members are inserted between the opposed plates at a point opposed to the slots 34 formed in the top portions of the plates 16.

It is thus apparent that the trolley construction provided may be readily secured to a trolley line 14 by merely positioning the trolley line over the two wheels 22 and then inserting the arms 26 between the opposed plates 16 until the lugs 32 snap into place and engage the top edge surfaces of the recesses 34. The trolley line 14, as will be noted in Fig. 2, will then be securely locked in channel 30. The assembly is of such a design as to provide no cracks or openings which facilitate the disengagement between the frame and weight portions of the trolley.

To release the weight assembly 12 from the frame assembly 10, tab portions 36, which are provided at the distal end limit of the spring arm members 26, are merely manually engaged and flexed inwardly toward each other. This flexing action enables the lug portions 32 of the arms to become disengaged from the surfaces of the slots 34, and thus the weight assembly 12 may be easily and readily withdrawn downwardly from between the opposed plate members 16.

It is apparent that the illustrated apparatus enables the trolley line 14 and the trolley to become disengaged by a single operation, namely, the flexing together of the spring arms 26 whereby the weight assembly 12 may be readily withdrawn from engagement with the frame assembly 10.

From the above, it is apparent that a trolley construction has been provided having two grooved wheels (although two are illustrated, it is, of course, obvious that a greater number may be employed, and the illustrated apparatus will function to equal advantage) which may simultaneously engage a trolley line. The wheels may be secured to the line by means of a novel weight assembly construction having opposed spring arm members which readily snap into place and lock the weight assembly to the trolley frame assembly by a single insertion operation. Conversely, to disengage the trolley construction illustrated from a trolley line, the distal end limits of the spring arm members need merely be flexed inwardly until the lug portions become disengaged from slot portions of the opposed plate members and the weight assembly is then withdrawn as a unit downwardly from between the two opposed plates. It is apparent that the single assembly and disassembly operations lock or disengage the entire trolley assembly from a trolley line regardless of the number of grooved wheels which the frame assembly has mounted thereon. The materials of construction for the frame assembly 10 should be rust resistant and are preferably of light-weight metal such as aluminum, or composed of a suitable plastic or spun glass. The weight component of the trolley, of course, should be composed of a dense material such as lead or other suitable heavy metal or material.

As above noted, the illustrated apparatus may be modified and other assemblies fabricated which remain within the ambit of the inventive concept contained in the illustrated embodiment. This invention is, therefore, to be limited only by the scope of the appended claims.

I claim:

1. A fishing trolley construction comprising two spaced-apart plates, at least two wheels journalled between said plates, readily detachable weight means subtending said wheels maintaining said wheels in engagement with a trolley line, and flexible attaching means affixed to said weight means for detachably securing said latter means to said plates.

2. A fishing trolley construction comprising two spaced-apart plates in substantially parallel relationship, trolley line engaging means secured between said plates, readily detachable weight means subtending said engaging means and maintaining said engaging means in working engagement with said trolley line, and flexible attaching means affixed to said weight means for detachably securing said latter means to said plates.

3. A fishing trolley construction comprising two spaced-apart plates, at least two wheels journalled between said plates, an enlongated weight subtending said wheels and having a longitudinally disposed rib formed integral therewith, said rib being adapted to be snugly received between said plates, and flexible attaching means affixed to said weight releasably securing said weight to said plates.

4. A fishing trolley construction comprising two opposed plates, at least two wheels journalled between said plates, a detachable weight subtending said wheels in the normal assembled position, said weight having a longitudinal rib portion adapted to be snugly received between said plates, flexible attaching means affixed to said weight securing said weight to said plates, and lug portions angularly disposed on said flexible attaching means adapted to engage edge surfaces of said plates whereby said weight may be detachably secured to said plates.

5. A fishing trolley construction comprising two opposed plates, at least two grooved wheels journalled between said plates, spacer means maintaining said plates in fixed spaced-apart relationship, a readily detachable weight subtending said wheels, said weight having a longitudinal rib formed integral therewith and adapted to be snugly received between edge portions of said plates, opposed spring arms affixed to said weight and insertable between said plates, the distal end portions of said spring arms surmounting said plate when said weight rib is inserted between said plates, lug portions protruding from said spring arm distal end portions adapted to engage edge surfaces of said plates, and tab portions defining the end limits of said spring arms adapted to be readily grasped and flexed toward each other whereby said spring arm lug portions may be disengaged from said plate edge surfaces and said weight may be readily disengaged from said opposed plates when said weight and said plates are in the normal assembled position.

6. A fishing trolley construction comprising two plates, spacer means maintaining said plates in fixed, substantially parallel spaced-apart relationship, a plurality of wheels journalled between said plates, each of said plates having a slot formed in a first longitudinal edge thereof, said slots being oppositely disposed, a readily detachable weight subtending said wheels, said weight being apertured in one end portion, a longitudinal rib formed integral with said weight and snugly received between the second longitudinal edges of said plates, flexible spring arms affixed to said weight and maintained in a diverging spaced-apart relationship, each of said arms having opposed outwardly projecting lug portions angularly disposed to said arms and resting on an edge surface of said plate slots, and angularly disposed tab portions comprising the distal end limits of said spring arms projecting above said plates whereby said arms may be flexed inwardly toward each other.

References Cited in the file of this patent

UNITED STATES PATENTS

| | | |
|---|---|---|
| 551,869 | Miller | Dec. 24, 1895 |
| 2,206,569 | John | July 2, 1940 |
| 2,594,620 | Braithwaite | Apr. 29, 1952 |
| 2,702,928 | Nielsen | Mar. 1, 1955 |